United States Patent
Reimann et al.

(10) Patent No.: US 11,272,422 B2
(45) Date of Patent: Mar. 8, 2022

(54) VEHICLE, SYSTEM, APPARATUSES, METHODS, AND COMPUTER PROGRAMS FOR USER EQUIPMENT OF A MOBILE COMMUNICATION SYSTEM

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE); Steffen Schmitz, Wesel (DE)

(73) Assignee: Volkswagen Aktiengesellschaft

(*) Notice: Subject to any disclaimer, the term of this patent is extended or adjusted under 35 U.S.C. 154(b) by 0 days.

(21) Appl. No.: 16/831,093

(22) Filed: Mar. 26, 2020

(65) Prior Publication Data
US 2020/0314728 A1    Oct. 1, 2020

(30) Foreign Application Priority Data
Mar. 27, 2019    (EP) .................................. 19165384

(51) Int. Cl.
*H04W 40/22*    (2009.01)
*H04W 40/12*    (2009.01)

(52) U.S. Cl.
CPC .......... *H04W 40/22* (2013.01); *H04W 40/12* (2013.01)

(58) Field of Classification Search
None
See application file for complete search history.

(56) References Cited

U.S. PATENT DOCUMENTS

| | | | |
|---|---|---|---|
| 9,603,079 B2* | 3/2017 | Tickoo | H04W 40/14 |
| 9,940,840 B1 | 4/2018 | Schubert et al. | |
| 10,025,315 B2* | 7/2018 | Klinger | H04B 7/18506 |
| 10,091,700 B1* | 10/2018 | Liu | H04W 4/025 |
| 10,091,702 B2 | 10/2018 | Park et al. | |
| 2004/0219909 A1* | 11/2004 | Kennedy | H04W 28/26 455/422.1 |

(Continued)

FOREIGN PATENT DOCUMENTS

| | | |
|---|---|---|
| CN | 106888494 A | 6/2017 |
| EP | 3307011 A1 | 4/2018 |

(Continued)

OTHER PUBLICATIONS

Prasad et al.; Energy Efficient D2D Discovery for Proximity Services in 3GPP LTE—Advanced Networks; IEEE Vehicular Technology Magazine; 2014; vol. 9, No. 4; pp. 40-50.

(Continued)

*Primary Examiner* — Brian S Roberts
(74) *Attorney, Agent, or Firm* — Barnes & Thornburg LLP (57) ABSTRACT

A transportation vehicle, a system, apparatuses, methods, and computer programs for user equipment of a mobile communication system. The method for a first user equipment (user equipment) of a mobile communication system includes determining a lack of coverage of the mobile communication system; determining two or more relay candidates, a relay candidate being a user equipment capable of providing network access for the first user equipment via direct communication; and selecting a second user equipment for network access from the two or more relay candidates based on a common route section of the first and second user equipments.

28 Claims, 5 Drawing Sheets

(56) References Cited

U.S. PATENT DOCUMENTS

| | | | |
|---|---|---|---|
| 2009/0310608 A1* | 12/2009 | Chen | H04W 76/50 |
| | | | 370/389 |
| 2011/0009062 A1* | 1/2011 | Anschutz | G08G 1/0112 |
| | | | 455/41.2 |
| 2012/0250563 A1* | 10/2012 | Liu | H04W 40/12 |
| | | | 370/252 |
| 2014/0056210 A1* | 2/2014 | Jafarian | H04W 88/04 |
| | | | 370/315 |
| 2015/0262481 A1 | 9/2015 | Selin | |
| 2016/0285539 A1* | 9/2016 | Sadiq | H04W 88/04 |
| 2017/0227968 A1* | 8/2017 | Klinger | H01Q 3/26 |
| 2017/0366958 A1 | 12/2017 | Ryu et al. | |
| 2018/0152986 A1 | 5/2018 | Jung et al. | |
| 2020/0221532 A1 | 7/2020 | Jung et al. | |

FOREIGN PATENT DOCUMENTS

| | | |
|---|---|---|
| EP | 3349506 A1 | 7/2018 |
| KR | 20100004199 A | 1/2010 |
| KR | 20160138928 A | 12/2016 |
| KR | 20190031237 A | 3/2019 |
| WO | 2018017194 A1 | 1/2018 |

OTHER PUBLICATIONS

Office Action for Korean Patent Application No. 10-2020-0037130; dated Mar. 31, 2021.

* cited by examiner

VEHICLE, SYSTEM, APPARATUSES, METHODS, AND COMPUTER PROGRAMS FOR USER EQUIPMENT OF A MOBILE COMMUNICATION SYSTEM

PRIORITY CLAIM

This patent application claims priority to European Patent Application No. 19165384.9, filed 27 Mar. 2019, the disclosure of which is incorporated herein by reference in its entirety.

SUMMARY

Illustrative embodiments relate to a transportation vehicle, a system, apparatuses, methods, and computer programs for user equipment of a mobile communication system, more particularly, but not exclusively, to a concept for determining user equipment for relaying signals to and from another user equipment in a mobile communication system.

BRIEF DESCRIPTION OF THE DRAWINGS

Disclosed embodiments will be described by way of example only, and with reference to the accompanying figures, in which.

DETAILED DESCRIPTION

Direct communication between mobile devices, also referred to as device-to-device (D2D), vehicle-to-vehicle (V2V), or car-to-car communication, has been a feature under development of newer generation of mobile communication systems. By enabling direct communication between devices, network coverage can be extended. Devices located in a coverage area of a mobile communication system may relay signals to devices located out of coverage.

Athul Prasad et al. disclose in "Energy Efficient D2D Discovery for Proximity Services in 3GPP LTE-Advanced Networks", an analysis of different discovery methods for D2D in light of the power consumption of the mobile devices during/for discovery. Document US 2015/0262481 A1 describes a concept for finding participants of a platoon. Based on information received from the transportation vehicles, inter-vehicle distances can be calculated. Based on the distances between the transportation vehicles, platoon members can be selected. Document U.S. Pat. No. 9,940,840 B1 discloses a computing system for selecting members of a platoon. The selected transportation vehicles travel in a coordinated arrangement in proximity to each other during at least a portion of a travel route.

Conventional concepts consider finding mobile transceivers in a proximity of each other. Mobile devices being in a proximity of each other may form a group/platoon using direct communication. Conventional concepts use different mechanisms for discovery, enabling mobile transceivers to detect each other and then setup a direct communication link. The direct communication between two mobile devices allows efficient communication of messages between the mobile devices, which mostly is the motivation of the prior art concepts. Network services access or internet access is not considered.

There is a demand for an improved concept for network access.

Disclosed embodiments are based on the finding that network access can be provided through relaying using direct communication between user equipment, UE. For the purpose of relaying, further criteria are important with respect to mobility. For example, routing information may be used to determine a proper candidate for relaying. For example, when a UE is out of coverage and seeks network access through another UE then it may be important that this other UE stays in a proximity for a certain amount of time. It is a finding that it can be more important to assure a certain duration of a proximity of a relaying UE than optimizing an available radio link quality. Hence, disclosed embodiments consider route commonality or route overlap as criterion when selecting a relaying UE from a set of suitable UEs.

Disclosed embodiments provide a method for a first UE of a mobile communication system. The method comprises determining a lack of coverage of the mobile communication system and determining two or more relay candidates. A relay candidate is a UE capable of providing network access for the first UE via direct communication. The method further comprises selecting a second UE for network access from the two or more relay candidates based on a common route section of the first and second UEs. Disclosed embodiments may enable more robust relaying by considering a common route section for the selection. Disclosed embodiments may avoid service interruptions evoked by divergent routes of a donor/relaying UE (second UE) and a serviced UE (first UE). This may provide benefits when relaying between transportation vehicles and for other relaying scenarios, e.g., in a train station as will be detailed in the sequel.

The method may further comprise receiving information related to route sections of the two or more candidates. Disclosed embodiments may enable an exchange of route information such that an effective service continuity can be achieved.

In some disclosed embodiments the method may further comprise selecting the second UE for network access further based on a radio link quality between the first and second UEs. Aside from the route commonality, disclosed embodiments may take a radio quality into account. From multiple candidate UEs fulfilling the route commonality criterion a UE may be selected offering the best radio quality. Disclosed embodiments may improve service quality and service continuity in a relaying scenario.

Among the two or more relay candidates there may be a third UE. A radio link quality between the first UE and the third UE may be better than the radio link quality between the first UE and the second UE. Hence, in an exemplary embodiment a UE may prioritize the route commonality criterion and select a relaying UE, for which the radio quality is not the best but for which the route commonality is high whilst the third UE is in coverage, therewith assuring service availability.

For example, the method may further comprise determining an estimated service duration for which the network access is required and the method may further comprise selecting the second UE based on the estimated service duration. Disclosed embodiments may evaluate an expected service duration, which can be related to a required route overlap with a relaying UE. Service continuity may be further enhanced by considering an estimated service duration.

Furthermore, the method may comprise estimating a direct link duration based on a route of the first UE and the route information of the relay candidates. Considering an estimated direct link duration for the selection of a relaying UE may further enhance service continuity. At least in some disclosed embodiments the method may comprise selecting the second UE such that the estimated service duration is shorter than an estimated direct link duration. Some disclosed embodiments may provide a high probability that the relaying UE can provide the relayed link for the service duration. Disclosed embodiments may reduce a number of handovers.

Disclosed embodiments also provide a method for a relay candidate UE of a mobile communication system. The method comprises receiving a request for relaying signals from a first UE to enable network access and providing route information to the first UE. The method further comprises receiving a relaying acknowledgement from the first UE and relaying signals from the first UE to the network. Disclosed embodiments enable relaying UEs to provide route information such that relaying links can be established based on route commonalities between a donor/relaying UE and a served UE.

In further disclosed embodiments the relaying may comprise relaying signals to the network via one or more further UEs. Disclosed embodiments may enable efficient multihop network establishment based on route commonalities.

For example, the method may comprise receiving information related to a duration of the requested relaying. Disclosed embodiments may enable a candidate UE to evaluate whether it could serve a requesting UE.

The route information may be related to the duration. In some disclosed embodiments a responding UE may indicate whether a certain degree of overlap relative to a requested duration of the relaying service is fulfilled. Mobility evoked signaling, e.g., by handovers between different donor UEs, may be reduced through consideration of the duration.

At least in some disclosed embodiments the method may further comprise providing information related to an estimated relaying quality for the request. Disclosed embodiments may allow improving service quality and service continuity.

Disclosed embodiments further provide an apparatus for a UE of a mobile communication system. The apparatus comprises one or more interfaces, which are configured to communicate in the mobile communication system. The apparatus further comprises a control module configured to control the one or more interfaces. The control module is further configured to perform one of the methods described herein. Another disclosed embodiment is a transportation vehicle or a UE comprising the apparatus.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
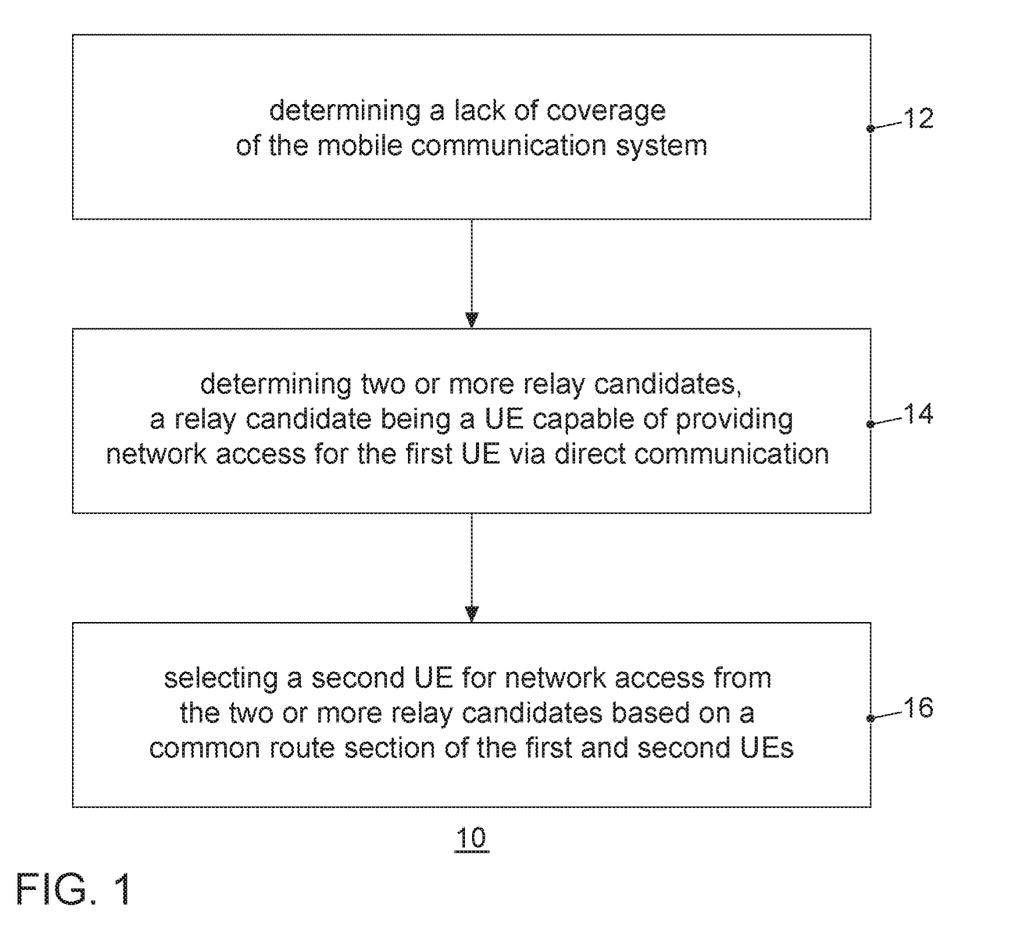
FIG. 1 illustrates a block diagram of an exemplary embodiment of a method for a first UE.

FIG. 1 shows a block diagram of an exemplary embodiment of a method 10 for a first UE of a mobile communication system. The method 10 comprises determining 12 a lack of coverage of the mobile communication system. The method further comprises determining 14 two or more relay candidates. A relay candidate is a UE capable of providing network access for the first UE via direct communication. The method 10 further comprises selecting 16 a second UE for network access from the two or more relay candidates based on a common route section of the first and second UEs.

Figure 2:
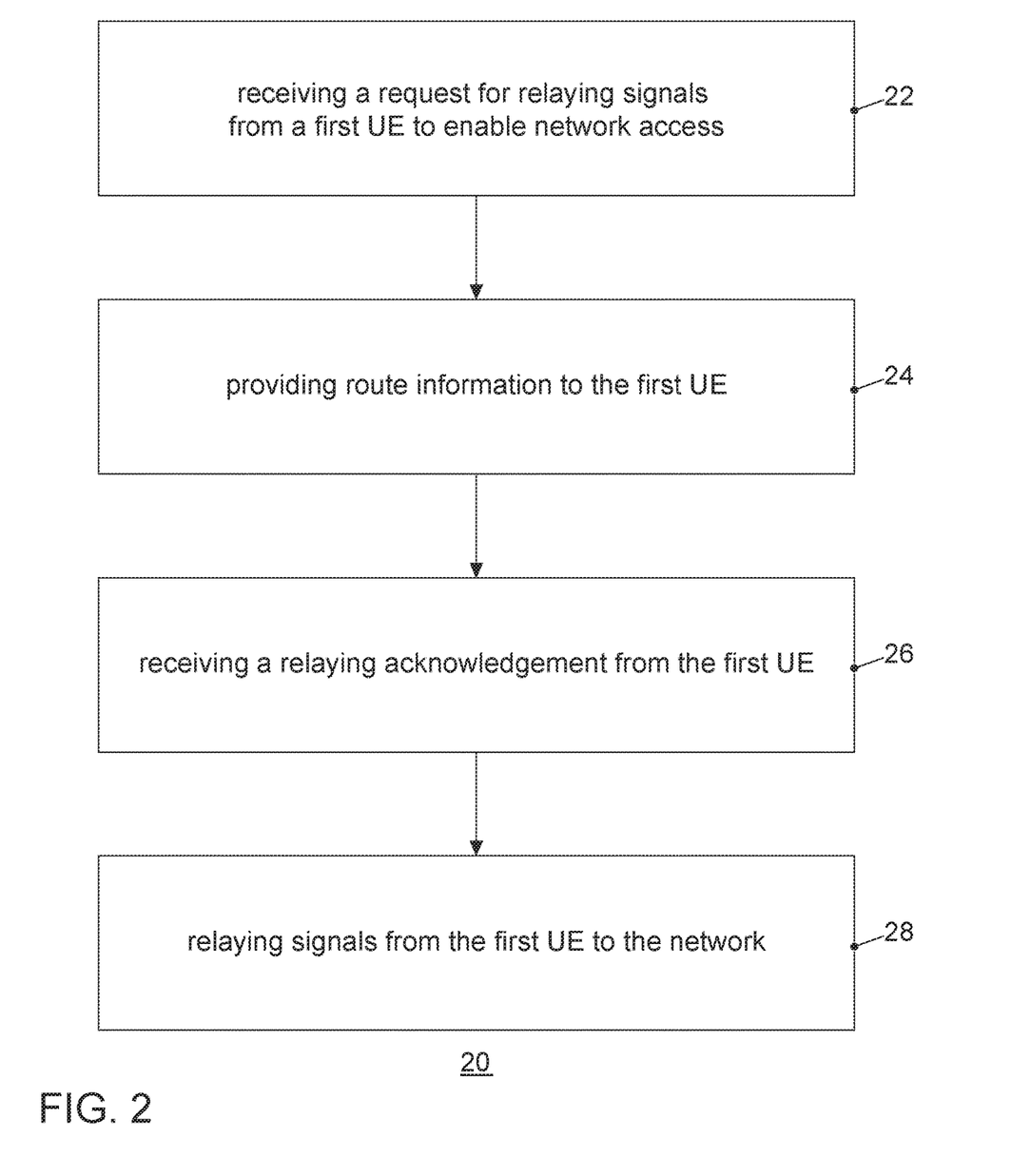
FIG. 2 shows a block diagram of an exemplary embodiment of another method for a relaying UE.

FIG. 2 shows a block diagram of an exemplary embodiment of a method 20 for a relay candidate UE of a mobile communication system. The method 20 comprises receiving 22 a request for relaying signals from a first UE to enable network access and providing 24 route information to the first UE. The method 20 further comprises receiving 26 a relaying acknowledgement from the first UE and relaying signals from the first UE to the network.

FIG. 1 illustrates the method 10 from the perspective of a first UE finding itself in an out-of-coverage situation. Such a situation may occur when infrastructure components such as e/g-NodeBs, base stations, etc. are not reachable or during a network outage. The first UE may then try to find another UE, which can relay signals to another access point/base station etc. Such other network access may be through another operator or just through extended coverage. Therefore, the first UE may determine other UEs in its proximity, which are potential candidates for relaying signals.

Figure 3:
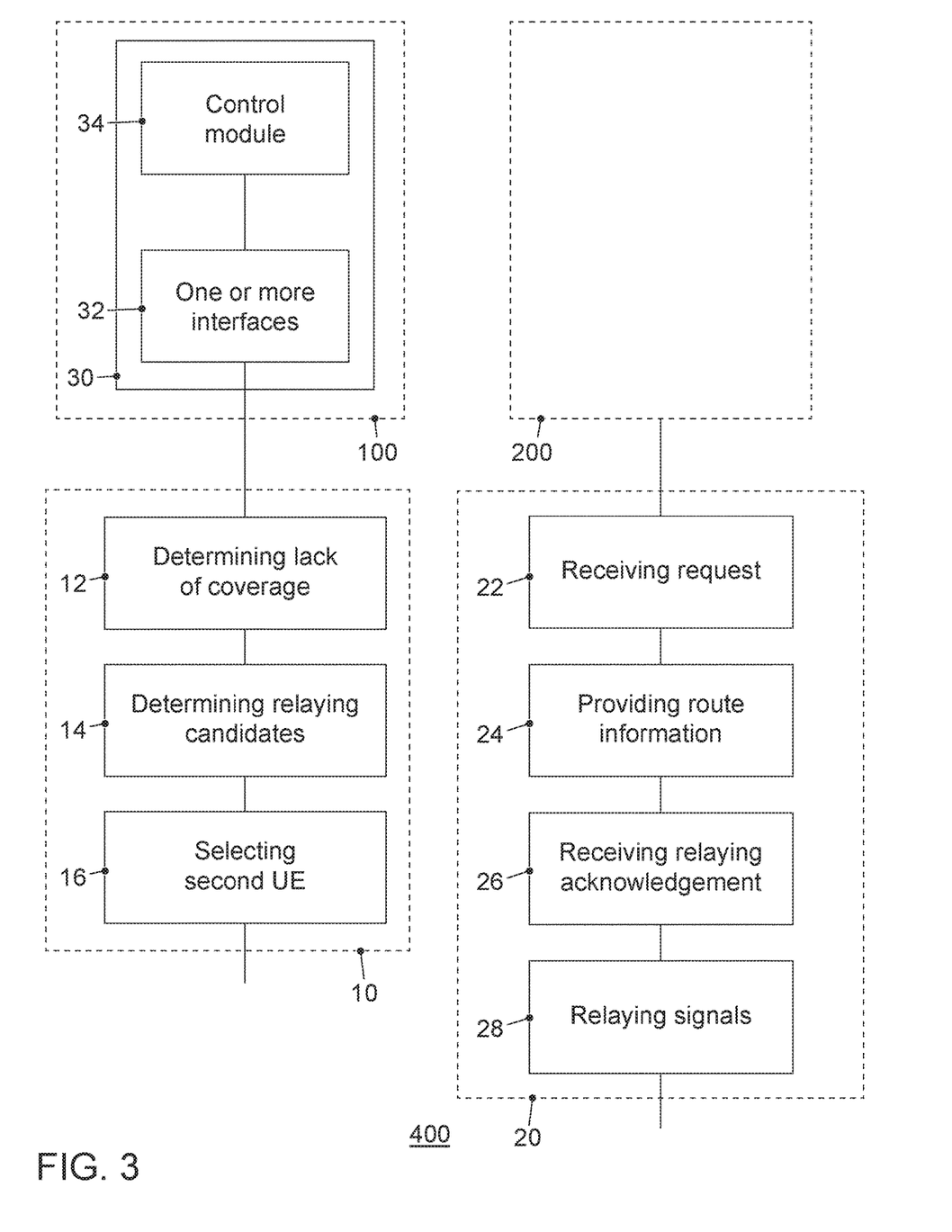
FIG. 3 illustrates block diagrams of exemplary embodiments of an apparatus for a UE, UEs, and a system.

FIG. 3 illustrates a block diagram of disclosed embodiments of an apparatus 30 for a UE, two UEs 100, 200, and a system 400.

The apparatus 30 for the UE 100 comprises one or more interfaces 32 configured to communicate in the mobile communication system 400. The apparatus 30 further comprises a control module 34, which is coupled to the one or more interfaces 32 and which is configured to control the one or more interfaces 32. The control module 34 is further configured to perform one of the methods 10, 20 as described herein. FIG. 3 further illustrates disclosed embodiments of UEs 100, 200 each comprising an exemplary embodiment of the apparatus 30. A transportation vehicle may be such a UE 100, 200 in another exemplary embodiment.

In disclosed embodiments, the one or more interfaces 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32 may serve the purpose of transmitting or receiving or both, transmitting and receiving, information, such as information related to capabilities, control information, payload information, application requirements, trigger indications, requests, messages, data packets, acknowledgement packets/messages, etc.

As shown in FIG. 3 the one or more interfaces 32 are coupled to the control module 34 at the apparatus 30. In disclosed embodiments the control module 34 may be implemented using one or more processing units, one or more processing devices, any method or mechanism for processing, such as a processor, a computer or a programmable hardware component being operable with accordingly adapted software. In other words, the described functions of the control modules 34 may as well be implemented in software, which is then executed on one or more programmable hardware components. Such hardware components may comprise a general purpose processor, a Digital Signal Processor (DSP), a micro-controller, etc.

FIG. 3 also shows an exemplary embodiment of a system 400 comprising disclosed embodiments of the UEs 100, 200. In disclosed embodiments, communication, i.e., transmission, reception or both, may take place among UEs 100, 200 directly and/or between mobile transceivers/transportation vehicles 100 and a network component (infrastructure or mobile transceiver, e.g., a base station, a network server, a backend server, etc.). Such communication may make use of a mobile communication system 400. Such communication may be carried out directly, e.g., by device-to-device (D2D) communication, which may also comprise vehicle-to-vehicle (V2V) or car-to-car communication in case of transportation vehicles 100, 200. Such communication may be carried out using the specifications of a mobile communication system 400.

In disclosed embodiments the one or more interfaces 32 can be configured to wirelessly communicate in the mobile communication system 400. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE.

FIG. 3 also illustrates an exemplary embodiment of the method 10 from the perspective of the first UE 100 and from the perspective of the second UE 200.

The first UE 100 determines a lack of coverage of the mobile communication system 400. In other words, the first UE 100 finds itself in a situation in which network services of its operator are not available. It then determines 14 two or more relay candidates. A relay candidate may be a UE capable of providing network access for the first UE via direct communication and may hence be located in the proximity of the first UE 100. Proximity is to be understood as close enough to directly communicate, e.g., within a range of radio communication using D2D, V2V, etc. For example, other services or systems may be present and the UE 100 may already have a picture/model (e.g., an environmental model derived from sensor data) of its surrounding and other UEs close by. For example, certain messages may be broadcast by the UEs for this purpose. In some disclosed embodiments the first UE 100 may transmit or send out a request message and surrounding UEs may receive such a request.

This is indicated in FIG. 3 from the perspective of the second UE 200 in operation at 22. The second UE 200, which at this stage is one out of two or more candidate UEs, may answer the request by providing 24 information on its route. This operation at 24 may have different implementations in different disclosed embodiments. For example, the first UE 100 may provide information on its own route already with the request 22. The second UE 200 may then only answer the request if certain conditions are fulfilled, for example, if there is a certain overlap with the route of the first UE 100 a response is sent. In other disclosed embodiments the first UE 100 may transmit the request and receive route information from the candidates in return. The determination of the route overlap or commonality may then be carried out at the first UE 100. The first UE 100 may hence receive multiple responses from candidate UEs in its proximity. In the disclosed embodiment shown in FIG. 3 the second UE 200 is selected 16 for network access from the two or more relay candidates based on a common route section of the first and second UEs 100, 200. In disclosed embodiments the common route section may be determined at the UE 100 or at the other UEs, e.g., they may only response if a common route section exists.

The first UE 100 may select the second UE 200 by transmitting an acknowledgment to the second UE 200, which is received at the second UE 200 in operation at 26 in FIG. 3. Upon reception of the acknowledgement the second UE 200 may start relaying the signals 28.

The mobile communication system 400, as shown in the FIG. 3, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio (NR)) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component such as a base station transceiver, a relay station or a UE, e.g., coordinating service provision in a cluster or group of multiple UEs. A base station transceiver can be operable or configured to communicate with one or more active mobile transceivers/transportation vehicles 100, 200 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 100, 200 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver/transportation vehicle 100, 200 can be associated with a network component, a base station transceiver or a cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following, a cell may represent an according base station transceiver generating the cell or, likewise, a base station transceiver may represent a cell the base station transceiver generates.

UEs/Transportation Vehicles 100, 200 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, DSRC, respectively. Technologies enabling such D2D-communication include 802.11p, 3GPP system (4G, 5G, NR and beyond), etc. For example, the two UEs 100, 200 in FIG. 3 are two transportation vehicles which share a certain section of their route. Accordingly, they would like to exchange certain messages, for example, Cooperative Awareness Messages (CAM) or Decentralized Environment Notification Messages (DENM), etc. For example, certain broadcast signals may be detected such that the transportation vehicles 100, 200 may become aware of each other. At some point, they would like to directly communicate with each other, e.g., to form a cluster or platoon or any other purpose.

It is to be noted that in some disclosed embodiments the UEs 100, 200 may be handheld devices. For example, a user in a train may operate the first UE 100 and may seek network access through a candidate UE. Assuming the first UE to be located in a certain train, it may be important to select the second UE 200 from candidates being in the same train and avoiding selecting a candidate from another train, e.g., in or near a train station. For example, a certain service in an exemplary embodiment may compare the route (e.g., in terms of train schedules) and then select a donor/second UE 200 from the same train. A similar scenario is conceivable in road traffic for a first UE 100 being located in a bus or car.

Figure 4:
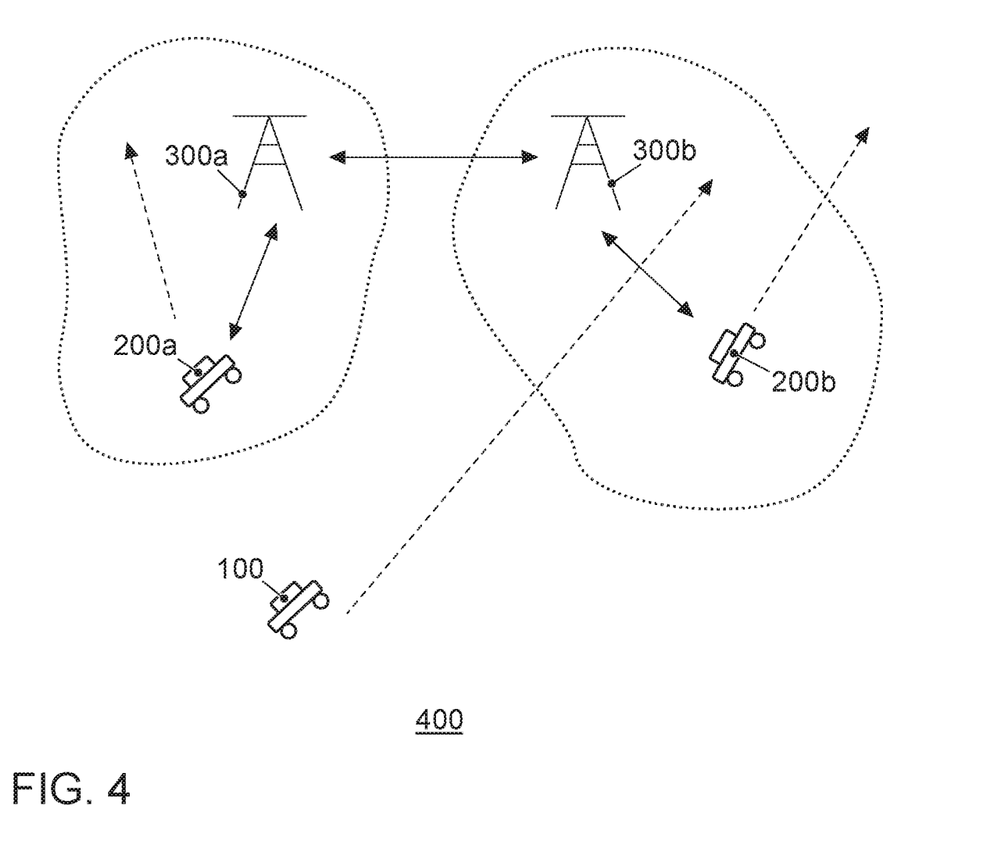
FIG. 4 depicts selection of a UE for relaying in an exemplary embodiment.

FIG. 4 depicts selection of a UE for relaying in an exemplary embodiment. In FIG. 4 the UEs are transportation vehicles. Transportation vehicle 100 drives along road and determines that there is no network service coverage. Using CAM messages, which may be broadcast by all transportation vehicles using 802.11p, it determines two other transportation vehicles 200a and 200b in its proximity. Both of these transportation vehicles have network service coverage, transportation vehicle 200a has a connection (radio link) to a base station 300a and transportation vehicle 200b has a connection (radio link) to base station 300b. These base stations 300a, 300b may belong to the same mobile communication system 400 in FIG. 4. The coverage areas of the base stations 300a, 300b are indicated by dotted lines. As can be seen transportation vehicle 100 is out of coverage. It may also belong to different operator and be out of coverage of its operator even if it was in the coverage on the base stations 300a, 300b. In a further disclosed embodiment base stations 300a, 300b may belong to different mobile communication systems having different access technologies or different operators. Moreover, the first UE 100/transportation vehicle may belong to the same or a different mobile communication system as well. The transportation vehicle 100 seeks network services, where different reasons are conceivable. For example, a driver of transportation vehicle 100 wants to do a voice call. Other applications/services are conceivable, e.g., a short message is to be sent, an email account is to be checked, a video or gaming session is to be established etc.

In the disclosed embodiment depicted in FIG. 4, transportation vehicle 100 needs to make a choice on whether to connect through transportation vehicle 200a or through transportation vehicle 200b. An exemplary embodiment of the above method 10 is therefore carried out at the transportation vehicle 100. In this disclosed embodiment it is further assumed that the method 10 comprises receiving information related to route sections of the two or more candidates. The information related to route sections may comprise an acknowledgement on a certain common routes section. This may happen in disclosed embodiments in which the UE 100 provided information relating to its own route first, e.g., together with an according request message.

In the disclosed embodiment shown in FIG. 4 it is assumed that the transportation vehicle 100 and the transportation vehicle 200b share a route section while transportation vehicle 200a is heading towards another direction. This is indicated by the broken line arrows. Therefore, transportation vehicle 100 selects transportation vehicle 200b as second UE (as relaying or donor UE). Moreover, in the present exemplary embodiment it is assumed that the method 10 further comprises selecting the second UE 200b for network access further based on a radio link quality between the first and second UEs 100, 200b. In other words, in addition to the information related to the route sections UE 100 may take a radio link quality into account. Such radio link quality can be determined by channel estimation or channel measurements. For example, such measurements may be based on reference or pilot symbols transmitted by the UEs and resulting in a quality metric such as a signal-to-noise-ratio, a signal-to-interference-and-noise-ratio, a receive signal strength indicator, a receive signal code power, etc.

Hence, transportation vehicle 100 may have information on the radio link qualities to transportation vehicles 200a and 200b. Transportation vehicle 200a can be considered as a third UE, which also is among the two or more relay candidates 200a, 200b. A radio link quality between the first UE (transportation vehicle 100) and the third UE (transportation vehicle 200a) may be better than the radio link quality between the first UE (transportation vehicle 100) and the second UE (transportation vehicle 200b). In this disclosed embodiment, although the radio link quality is better for transportation vehicle 200a, transportation vehicle 200b is selected for its route commonality.

The method 10 may further comprise determining an estimated (required) service duration for which the network access is required. The selecting of the second UE can then be based on the estimated (required) service duration. For example, transportation vehicle 100 would like to make a phone call with an estimated duration of 2 minutes. From its own route information, transportation vehicle 100 can estimate that it would need the access service for a section of 2 km. With the route information of transportation vehicles 200a and 200b it can now be determined, that transportation vehicle 200a may offer a better radio link quality now, but because of its diverting route the routes' overlap will not be long enough to complete the phone call. The method 10 further comprises estimating a direct link duration based on a route of the first UE 100 and the relay candidates. As the link duration with transportation vehicle 200a would be too short for the service duration transportation vehicle 200b gets selected. In general, the second UE may be selected in a way such that the estimated (required) service duration is shorter than an estimated direct link duration, not to cause service interruptions. As can be seen from this example, the selection of the second UE has implication on subsequent mobility procedures, e.g., the number of handovers. Particularly if the service duration is long handovers may be inevitable. However, by taking into account a route overlap, disclosed embodiments enable a signaling overhead reduction to at least some extent.

In further disclosed embodiments service interruptions might not be avoidable. This may depend on the service duration, which can be long or even unpredictable. In general, with the information at hand, selection of the relaying or donor UE may be carried out based on these criteria and signaling overhead and service interruptions may be considered.

Figure 5:
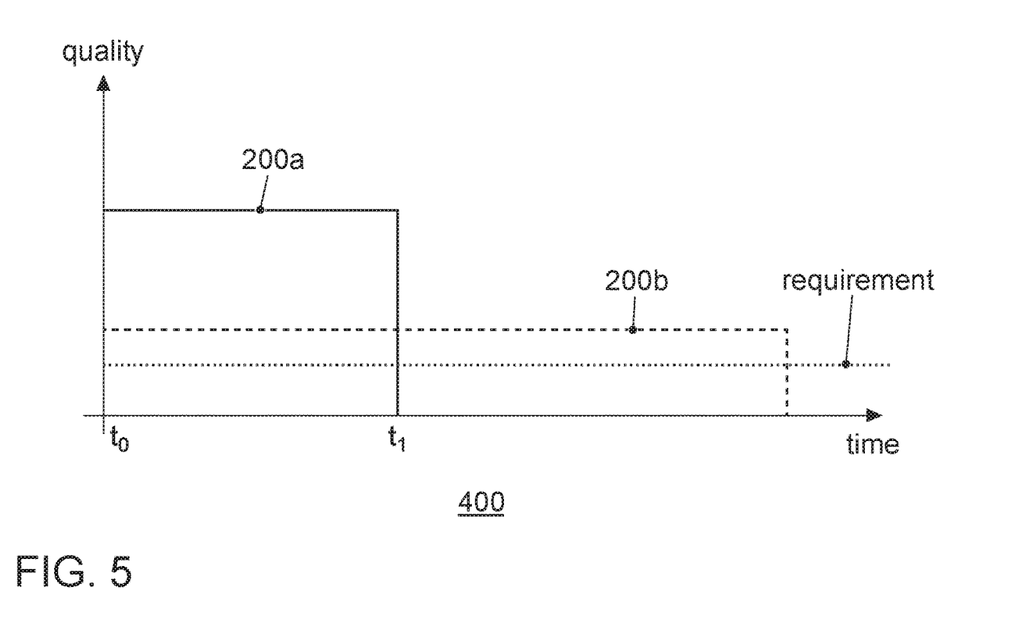
FIG. 5 shows a viewgraph illustrating the selection in another exemplary embodiment.

FIG. 5 shows a viewgraph illustrating the selection in another disclosed embodiment. FIG. 5 shows a viewgraph with radio link quality on the abscissae and time on the ordinate. As explained above, in the scenario of FIG. 4 transportation vehicle 200a has a better radio link quality than transportation vehicle 200b now (at time t0 in the viewgraph). From the route commonality or overlap it can be predicted that the radio link to transportation vehicle 200a will collapse because of diverting routes at a certain point in time, t1. As the time for the service (service duration) is predicted to exceed t1, transportation vehicle 200b gets selected. FIG. 5 also shows a quality of service requirement using a dotted line, which is fulfilled by both transportation vehicles 200a, 200b between t0 and t1. After t1 it is only fulfilled by transportation vehicle 200b. This example also shows that for another service, e.g., sending out an email, the selection may change. The send out/upload of the email may only need a few seconds. The route overlap with transportation vehicle 200a may be long enough to cover for this duration. Now, transportation vehicle 200a can be selected as the desired service can be completed before t1.

In the disclosed embodiments illustrated by FIGS. 4 and 5 the relaying happens via one UE 200b only. In further disclosed embodiments the relaying can involve multiple relaying UEs such that a multihop network component is formed. The method 20 on the side of the second or relying UE 200 may then comprise relaying signals to the network via one or more further UEs. As it has been outlined before, from the perspective of a relaying UE the method 20 may further comprise receiving information related to a duration of the requested relaying. Hence, the requesting UE 100 may provide information on an estimated duration for the relaying connection or service together with the request. The candidate UE may then take this information into account, e.g., when evaluating a route overlap. The route information may be related to the duration. For example, the route information may only be provided to the requesting UE if a route overlap can be expected for the duration. If a route overlap (as indicating for an availability of a direct radio communication) is not long enough, a response to a requesting UE might not be provided.

In further disclosed embodiments the method 20 on the candidate UE side may further comprise providing information related to an estimated relaying quality for the request. The information on the estimated quality may then be used on the requesting UE side to decide on which UE to select. In other words, on the first UE's side the selection may be further based on information related to an estimated relaying quality indicated by a candidate UE. Such information may comprise a predicted QoS, e.g., in terms of a latency, data rate, error rate, etc.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and disclosed embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for first user equipment
12 determining a lack of coverage of the mobile communication system
14 determining two or more relay candidates, a relay candidate being a UE capable of providing network access for the first UE via direct communication 16 selecting a second UE for network access from the two or more relay candidates based on a common route section of the first and second UEs
20 method for candidate user equipment
22 receiving a request for relaying signals from a first UE to enable network access
24 providing route information to the first UE
26 receiving a relaying acknowledgement from the first UE
28 relaying signals from the first UE to the network
30 apparatus for user equipment
32 one or more interfaces
34 control module
100 first user equipment
200 second user equipment
200a candidate user equipment
200b candidate user equipment
300a base station
300b base station
400 mobile communication system

The invention claimed is:

1. An apparatus for first user equipment of a mobile communication system, the apparatus comprising:
   a processor;
   one or more interfaces to communicate in the mobile communication system; and
   a non-transitory computer readable storage medium storing instructions, which, when executed by the processor, causes the apparatus to control the one or more interfaces and the first user equipment, the first user equipment having a route, wherein controlling the first user equipment comprises:
   determining a lack of coverage of the mobile communication system,
   determining two or more relay candidates, a relay candidate being user equipment capable of providing network access for the first user equipment via direct communication and having a route, wherein the route of the relay candidate has a common route section with route of the first user equipment, and
   selecting a second user equipment for network access, the second user equipment being one of the two or more relay candidates, wherein the selection of the second user equipment is based on the common route section of the first user equipment and the one of the two or more relay candidates.

2. The apparatus of claim 1, wherein information related to route sections of the two or more candidates is received by the apparatus.

3. The apparatus of claim 1, wherein the second user equipment for network access is selected based on a radio link quality between the first and second user equipment.

4. The apparatus of claim 3, wherein there is a third user equipment included in the two or more relay candidates, which has a radio link quality with the first user equipment that is better than the radio link quality between the first user equipment and the second user equipment.

5. The apparatus of claim 1, wherein an estimated service duration for which the network access is required is determined and wherein the second user equipment is selected based on the estimated service duration.

6. The apparatus of claim 5, wherein a direct link duration is determined based on a route of the first user equipment and the relay candidates.

7. The apparatus of claim 6, wherein the second user equipment is selected so the estimated service duration is shorter than an estimated direct link duration.

8. A transportation vehicle comprising the apparatus of claim 1.

9. A non-transitory computer readable medium including a computer program for performing the operations performed under control of the control unit of claim 1 when the computer program is executed on a computer, a processor, or a programmable hardware component.

10. An apparatus for a relay candidate user equipment of a mobile communication system, the apparatus comprising:
    a processor;
    one or more interfaces to communicate in the mobile communication system; and
    a non-transitory computer readable storage medium storing instructions, which, when executed by the processor, causes the apparatus to control the one or more interfaces and the relay candidate user equipment, wherein controlling the relay candidate user equipment comprises:
    receiving a request for relaying signals from a first user equipment to enable network access, the request including first route information associated with the first user equipment,
    upon determining that the first route information has an overlap with a second route information associated with the relay candidate user equipment, providing the second route information to the first user equipment,
    receiving a relaying acknowledgement from the first user equipment, and
    relaying signals from the first user equipment to the network.

11. The apparatus of claim 10, wherein the relay includes relaying signals to the network via one or more further user equipment.

12. The apparatus of claim 11, wherein information related to a duration of the requested relaying is received by the apparatus.

13. The apparatus of claim 12, wherein the second route information is related to the duration.

14. The apparatus of claim 10, wherein information related to an estimated relaying quality for the request is provided to the first user equipment.

15. A transportation vehicle comprising the apparatus of claim 10.

16. A non-transitory computer readable medium including a computer program for performing the operations performed under control of the apparatus of claim 10 when the computer program is executed on a computer, a processor, or a programmable hardware component.

17. A method for first user equipment of a mobile communication system, the first user equipment having a route, the method comprising:
    determining a lack of coverage of the mobile communication system;
    determining two or more relay candidates, a relay candidate being a user equipment capable of providing network access for the first user equipment via direct communication and having a route, wherein the route of the relay candidate has a common route section with the route of the first user equipment; and
    selecting a second user equipment for network access, the second user equipment being one of the two or more relay candidates, wherein the selection of the second user equipment is based on the common route section of the first user equipment and the one of the two or more relay candidates.

18. The method of claim 17, further comprising receiving information related to route sections of the two or more candidates.

19. The method of claim 17, further comprising selecting the second user equipment for network access further based on a radio link quality between the first and second user equipment.

20. The method of claim 19, wherein a third user equipment of the two or more relay candidates has a radio link quality with the first user equipment that is better than the radio link quality between the first user equipment and the second user equipment.

21. The method of claim 17, further comprising determining an estimated service duration for which the network access is required and further selecting the second user equipment based on the estimated service duration.

22. The method of claim 21, further comprising estimating a direct link duration based on a route of the first user equipment and the relay candidates.

23. The method of claim 22, further comprising selecting the second user equipment so the estimated service duration is shorter than an estimated direct link duration.

24. A method for relay candidate user equipment of a mobile communication system, the method comprising:
receiving a request for relaying signals from a first user equipment to enable network access, the request including first route information associated with the first user equipment;
upon determining that the first route information has an overlap with a second route information associated with the relay candidate user equipment, providing the second route information to the first user equipment;
receiving a relaying acknowledgement from the first user equipment; and
relaying signals from the first user equipment to the network.

25. The method of claim 24, wherein the relaying comprises relaying signals to the network via one or more further user equipment.

26. The method of claim 25, further comprising receiving information related to a duration of the requested relaying.

27. The method of claim 26, wherein the second route information is related to the duration.

28. The method of claim 24, further comprising providing information related to an estimated relaying quality for the request.

* * * * *